(No Model.)
A. B. CROSS.
APPARATUS FOR MEASURING CLOTH IN BOLT.
No. 372,660. Patented Nov. 8, 1887.
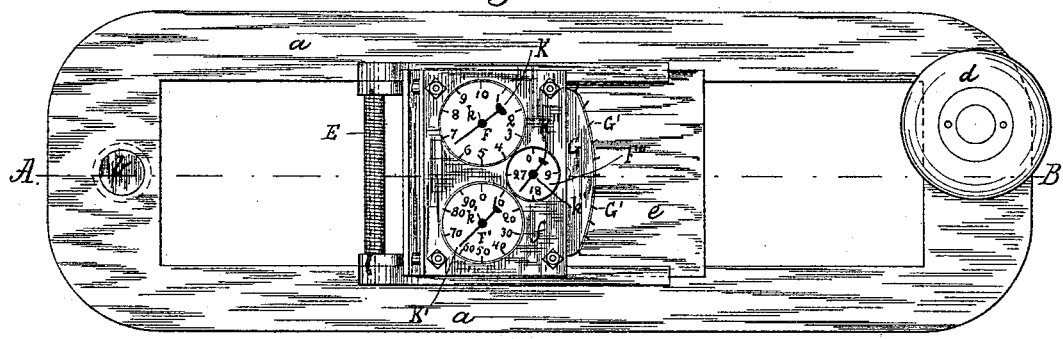
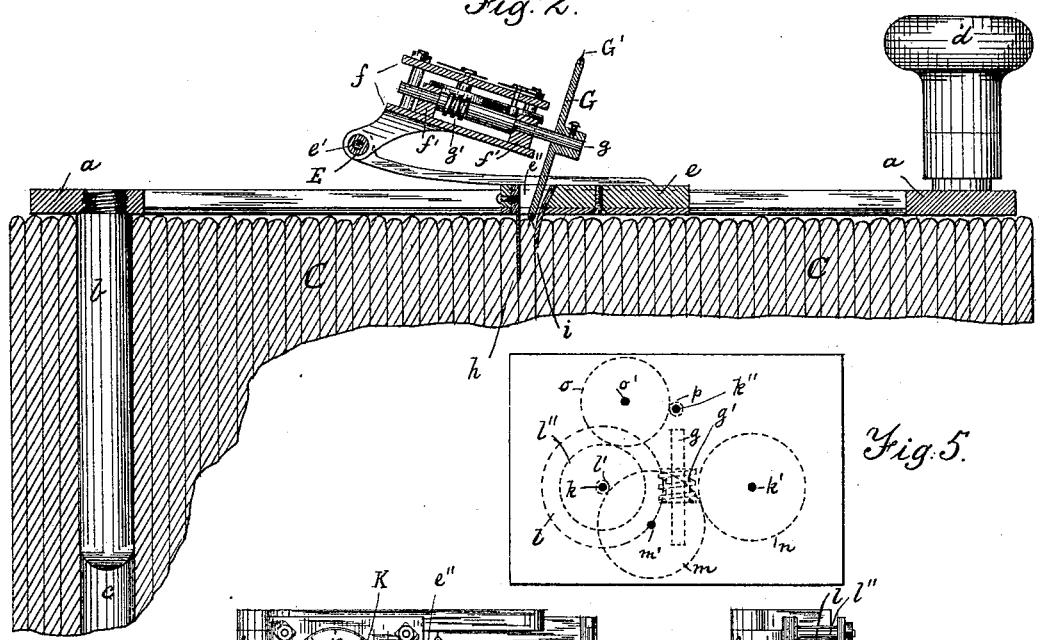
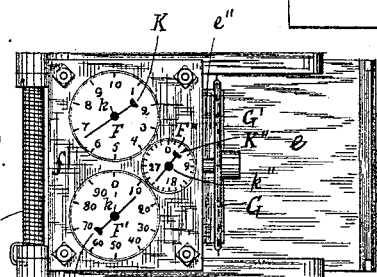
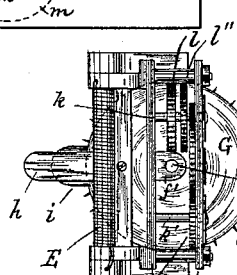
Witnesses.
Charles H. Fogg.
Henry Chadbourn.
Inventor.
Andrew B. Cross.
by Alban Andrèn, his atty.

UNITED STATES PATENT OFFICE.

ANDREW B. CROSS, OF SALEM, MASSACHUSETTS.

APPARATUS FOR MEASURING CLOTH IN BOLTS.

SPECIFICATION forming part of Letters Patent No. 372,660, dated November 8, 1887.

Application filed June 20, 1887. Serial No. 241,838. (No model.)

*To all whom it may concern:*

Be it known that I, ANDREW B. CROSS, a citizen of the United States, and a resident of Salem, in the county of Essex and State of Massachusetts, have invented new and useful Improvements in Spiral Measuring Devices, of which the following, taken in connection with the accompanying drawings, is a specification.

This invention relates to an improved device for measuring the length of spirally-wound fabrics—such as carpets, cloth, &c.—without the need of laying them out flat, as is commonly done.

The invention is carried out as follows, reference being had to the accompanying drawings, where—

Figure 1 represents a plan view of the invention. Fig. 2 represents a longitudinal section on the line A B, shown in Fig. 1. Fig. 3 represents a plan view of the sliding carriage and indicator. Fig. 4 represents an end view of the said carriage, and Fig. 5 represents in dotted lines a plan view of the gears for the indicators.

Similar letters refer to similar parts wherever they occur on the different parts of the drawings.

In carrying out my invention I use a hollow frame, $a$, to one end of which is secured in a suitable manner the downwardly-projecting rod or spindle $b$, adapted to be inserted in the central perforation, $c$, in the roll of carpeting or other spirally-wound fabric C, as shown in Fig. 2, the bottom of the plate or frame $a$ being made to rest on top of said roll C, as shown.

$d$ is a suitable knob or crank secured to or pivoted to the frame $a$, as shown in Figs. 1 and 2, such knob or crank serving for the operator to take hold of when turning the frame $a$ around the pivot $b$ when measuring the length of the spirally-wound fabric.

On the longitudinal inner edges of the hollow frame $a$ is made to slide freely the grooved carriage $e$, to which is loosely pivoted at $e'$ the indicator case or frame $f$, containing the mechanism and dial or dials and indexes for indicating the length of the fabric that is being measured.

In bearings $f'$ $f'$, attached to the case or frame $f$, is journaled the worm-shaft $g$, having the worm $g'$ on it, as shown in Figs. 2 and 5.

To the forward end of the worm-shaft $g$ is secured the circular disk G, studded on its periphery with points, teeth, or projections G' G',
as shown, which latter are adapted to enter the upper edge of the spirally-wound layers of the fabric as the frame $a$ is being turned around its axis $b$. The upper edges of the spirally-wound layers of the fabric to be measured are apt not to be of a uniform height, as illustrated in Fig. 2, and it is therefore essential that the toothed measuring-disk G should be free to rise and fall, so that it shall be kept in contact with the upper edge of the fabric, no matter how irregular in height its successive layers may be, and it is therefore that I have hinged the case or frame $f$ at $e'$ to the sliding carriage $e$, as shown, the weight of said frame $f$ and its adjuncts being usually sufficient to keep the disk G in contact with the upper edge of the fabric C.

In practice I prefer to surround the hinge-pin $e'$ with a spiral spring, E, one end of which is secured to one of the rear projections of the carriage $e$ and the other end to the frame $f$, so as to cause the periphery of the disk G to be held with a yielding pressure against the upper edges of the fabric, as shown. The disk G is made to play up and down freely in a slot, $e''$, in the carriage $e$, as shown in Figs. 2 and 3.

To the carriage $e$ is secured in a suitable manner the downwardly-projecting thin metal guide and feed-piece $h$, that is adapted to enter the space between two successive layers in the fabric or carpet roll C, as shown in Figs. 2 and 4, and thus cause the disk G to follow the upper edges of the spiral layers of the fabric as the frame $a$ is being turned around its axis. To enable the toothed disk G to act properly at or near the upper edges of the successive layers in the spirally-wound fabric, I prefer to secure to the frame or carriage $e$ a downwardly-projecting metal plate or spreader, $i$, (shown in Figs. 2 and 4,) the object of which is to spread the upper ends of the layer acted on by the toothed disk G and the one outside of it sufficiently to enable the said toothed disk G to act properly and roll positively on it.

On top of frame $f$ are arranged one or more graduated dials, F F' F'', provided with corresponding index-fingers, K K' K'', attached to the respective spindles $k$ $k'$ $k''$, as shown, I wish to state that I do not desire to confine myself to any particular registering mechanism or combination of gears for connecting the shaft $g$ to the indexes K K' K", as this may be done in any well-known manner without departing from the essence of my invention. In the drawings, however, I have shown the worm $g'$ as meshing in the worm-gear $l$, secured to spindle $k$, and to the latter is further secured a small pinion, $l'$, which, by means of the intermediate gear, $m$, on a spindle, $m'$, and the gear $n$ on the spindle $k'$, conveys motion to the index K'. By means of the gear $l''$ on the spindle $k$, and the intermediate gear, $o$, on the spindle $o'$ and the small pinion $p$ on the spindle $k''$, a rotary motion is conveyed to the index K". This arrangement and combination of gears and spindles may, however, be varied according to circumstances without departing from the essence of my invention.

In using my device for measuring the length of a roll of carpet or other fabric, I place the roll vertically on one of its ends. I then insert the spindle $b$ in the central cavity, $c$, of the fabric C. The indexes being set at zero, I place the sliding carriage $e$ in such a position relative to the frame $a$ that the toothed disk G shall rest on the outer end of the outer layer of the roll, with the feed-piece $h$ projecting downward between the outer layer and the one next to it. The frame $a$ now resting on top of the roll C, I turn said frame around its spindle $b$, thereby causing the toothed disk G to follow positively the upper edges of the successive layers of the roll C, and the sliding carriage $e$ to be gradually fed to the center of the roll by means of the thin feed-piece $h$, as described, until the central end of the roll is reached, when the length of the fabric will be found accurately indicated on the dials F F' F".

Having thus fully described the nature, construction, and operation of my invention, I wish to secure by Letters Patent, and claim—

1. The frame $a$ and its pivot or spindle $b$, combined with the sliding carriage $e$, the index-carrying frame $f$, hinged to said carriage, the toothed measuring-wheel G G', journaled in said frame $f$, and the feed-piece $h$, secured to the carriage $e$, as and for the purpose set forth.

2. The frame $a$ and its spindle or pivot $b$, and the sliding carriage $e$, having pivoted to it the frame $f$, combined with the toothed measuring disk or wheel G G', journaled in said frame $f$, the feed-piece $h$, and spreader $i$, secured to carriage $e$, as and for the purpose set forth.

In testimony whereof I have signed my name to this specification, in the presence of two subscribing witnesses, on this 15th day of June, A. D. 1887.

ANDREW B. CROSS.

Witnesses:
  ALBAN ANDRÉN,
  HENRY CHADBOURN.